(12) United States Patent
Lines et al.

(10) Patent No.: US 11,639,476 B2
(45) Date of Patent: May 2, 2023

(54) STEAM/CARBON RATIO DETECTION AND CONTROL

(71) Applicant: HYAXIOM, INC., East Hartford, CT (US)

(72) Inventors: Michael T. Lines, South Windsor, CT (US); John L. Preston, Hebron, CT (US)

(73) Assignee: HYAXIOM, INC., East Hartford, CT (US)

( * ) Notice: Subject to any disclaimer, the term of this patent is extended or adjusted under 35 U.S.C. 154(b) by 0 days.

(21) Appl. No.: 17/846,513

(22) Filed: Jun. 22, 2022

(65) Prior Publication Data

US 2022/0389338 A1  Dec. 8, 2022

Related U.S. Application Data

(63) Continuation of application No. 13/261,553, filed as application No. PCT/US2010/001890 on Jul. 2, 2010, now abandoned.

(51) Int. Cl.
| | |
|---|---|
| *H01M 8/0612* | (2016.01) |
| *H01M 8/0662* | (2016.01) |
| *C10J 1/20* | (2006.01) |

(52) U.S. Cl.
CPC ............. *C10J 1/20* (2013.01); *H01M 8/0618* (2013.01); *C01B 2203/0233* (2013.01);
(Continued)

(58) Field of Classification Search
CPC .......... C01B 2203/169; C01B 2203/16; C01B 2203/1614; C01B 2203/1619;
(Continued)

(56) References Cited

U.S. PATENT DOCUMENTS

| | | |
|---|---|---|
| 3,585,077 A | 6/1971 | Waldman |
| 3,585,078 A | 6/1971 | Sederquist et al. |

(Continued)

FOREIGN PATENT DOCUMENTS

WO    2008036090 A1    3/2008

OTHER PUBLICATIONS

International Search Report for International application No. PCT/US2010/001 890 dated Apr. 27, 2011.

(Continued)

*Primary Examiner* — Imran Akram
(74) *Attorney, Agent, or Firm* — Carlson, Gaskey & Olds, P.C.

(57) ABSTRACT

An ejector receives steam at a primary inlet and natural gas at a secondary inlet. A computer responds to a signal indicating current in the load of a fuel cell as well as a signal indicating temperature of a steam reformer to move a linear actuator to control a needle that adjusts the size of the steam orifice. Reformate is fed to a separator scrubber which cools the reformate to its dew point indicated by a sensor. From that, a controller generates the fuel/carbon ratio for display and to bias a signal on a line regulating the amount of steam passing through an ejector to the inlet of the reformer. Alternatively, the reformate may be cooled to its dew point by a controllable heat exchanger in response to pressure and temperature signals.

15 Claims, 2 Drawing Sheets

(52) U.S. Cl.
CPC ............... *C01B 2203/0415* (2013.01); *C01B 2203/066* (2013.01); *C01B 2203/1241* (2013.01); *C01B 2203/169* (2013.01); *C01B 2203/1619* (2013.01); *C01B 2203/1685* (2013.01); *H01M 8/0662* (2013.01)

(58) Field of Classification Search
CPC ...... C01B 2203/0233; C01B 2203/066; C01B 2203/0415; C01B 2203/1241; C01B 2203/1685; C01B 3/32; B01J 19/0013; H01M 8/0662; H01M 8/0618
See application file for complete search history.

(56) References Cited

U.S. PATENT DOCUMENTS

| | | |
|---|---|---|
| 3,961,986 A | 6/1976 | Waldman |
| 4,002,805 A | 1/1977 | Waldman |
| 5,094,926 A | 3/1992 | Kobayashi |
| 6,103,411 A | 8/2000 | Matsubayashi |
| 6,376,114 B1 | 4/2002 | Bonville |
| 6,797,418 B1 | 9/2004 | Nomura et al. |
| 2004/0093797 A1 | 5/2004 | Bingham et al. |
| 2005/0282096 A1 | 12/2005 | Kabir et al. |
| 2006/0000142 A1 | 1/2006 | Cui et al. |
| 2007/0107308 A1 | 5/2007 | Bonadies |
| 2008/0241059 A1 | 10/2008 | Peng |
| 2009/0246573 A1 | 10/2009 | Grasso et al. |
| 2010/0003558 A1 | 1/2010 | Evans et al. |
| 2010/0304231 A1* | 12/2010 | Lines ................. H01M 8/04119 429/410 |
| 2013/0004864 A1* | 1/2013 | Kaneko ............ H01M 8/04761 429/410 |
| 2013/0056648 A1* | 3/2013 | Fahs, II ................. C02F 1/725 210/695 |

OTHER PUBLICATIONS

Written Opinion of the International Searching Authority for International application No. PCT/US2010/001890 dated Apr. 27, 2011.
Transmittal of International Preliminary Report on Patentability for International application No. PCT/US2010/01890 dated Jan. 17, 2013.

* cited by examiner

STEAM/CARBON RATIO DETECTION AND CONTROL

CROSS-REFERENCE TO RELATED APPLICATIONS

This application is a continuation of U.S. patent application Ser. No. 13/261,553, filed Dec. 28, 2012, which is a national stage application of International Application No. PCT/US2010/001890, filed Jul. 2, 2010.

TECHNICAL FIELD

The temperature of water-saturated steam reformer reformate, which is the dew point of the reformate, is used to calculate the steam/carbon ratio, to provide an indication for routine maintenance or repair, and optionally as feedback to control a controller's positioning of a metering valve that provides natural gas to a steam/natural gas ejector that feeds the steam reformer.

BACKGROUND ART

One example of a system in which steam reformers are preferred (rather than autothermal reformers or catalytic partial oxidizers, etc.) is in providing reformate gas to feed a fuel cell power plant. The steam reformer is particularly suited to high temperature fuel cells, such as phosphoric acid fuel cells, where the steam reformer can be supplied with steam stripped from coolant water circulating through the fuel cell. If a separate boiler is used, the waste heat from the fuel cell can supply the energy necessary to produce the required steam for the reformer. The steam/carbon ratio of a steam reformer is critical since too low a ratio subjects the reformer to potential carbon buildup that can result in blockage of the reformer, and shut down of the fuel cell power plant. Too high a steam/carbon ratio reduces the overall electrical efficiency with respect to the input fuel. A high steam/carbon ratio also increases the pressure drop across the fuel processor and reduces the availability of high grade heat for the customer.

Since the measurement of steam is both expensive and unreliable, prior art systems have utilized ejectors to maintain a suitably controlled steam/carbon ratio, as the demand for flow of reformate varies, without measuring either. Examples are U.S. Pat. Nos. 3,585,078 and 4,002,805, both incorporated herein by reference. Both systems use an ejector having a controllable, metering orifice. The position of the needle (sometimes referred to as a pintle or a plug) is controlled in various ways by fuel cell load current and reformer temperature. Systems of this sort have sometimes been referred to as passive, steam/carbon ratio control systems.

The passive, ejector steam/carbon control methodology has heretofore proven itself to be satisfactory. Such systems do tend to veer away from the designed, optimal range of steam/carbon ratios over time. However, there is no means by which to monitor changes in the steam/carbon ratio, throughout the life of the power plant, except by on-site diagnosis using actual measurements of steam and carbon in the reformate feed.

The ejector is usually designed to achieve a relatively high but safe ratio, such as around 3.5, to ensure that carbon buildup is avoided. But that results in lower efficiency and power output.

Therefore, the measurement of a steam/carbon ratio other than by measuring the steam and carbon components of effluent feed, displaying that ratio, and/or providing a closed loop, feedback control system to maintain the steam/carbon ratio within desired limits, are both desirable for fuel processing systems utilizing steam reformers.

SUMMARY

It has been determined that the steam/carbon ratio of steam reformer feed can be closely approximated by calculation, or reference to a table, from the dew point of the reformate flowing toward the fuel cell. The superheated reformate must be cooled in apparatus to reach its dew point. In turn, it has been found that the dew point of the steam reformer effluent can be determined from reformate gas that has passed through a water counterflow separator scrubber, in an ammonia removal system, which cools the superheated reformate and ensures saturation of the reformate with water, thereby identifying the temperature of the reformate as the dew point of the reformate.

The steam/carbon ratio calculated from the scrubbed reformate dew point is made available for display, thus allowing regular maintenance intervals to include determination of whether the steam/carbon ratio is within desired limits, track trends of the ratio over periods of time, and detect failures, such as steam leaks. Additionally, once the ratio is calculated, the controller can readily adjust, or bias, the admission of fuel to the ejector to return the steam/carbon ratio to within its desired limits. This allows setting the ejector design ratio to a low ratio, close to 2.5, resulting in improved electrical efficiency and generation of electrical power.

In any system which does not utilize an ammonia removal system, the reformate can be cooled by a heat exchanger which is variably controlled in response to temperature and pressure so as to limit the cooling to reaching the dew point.

Other variations will become more apparent in the light of the following detailed description of exemplary embodiments, as illustrated in the accompanying drawings.

MODE(S) OF IMPLEMENTATION

Figure 1:
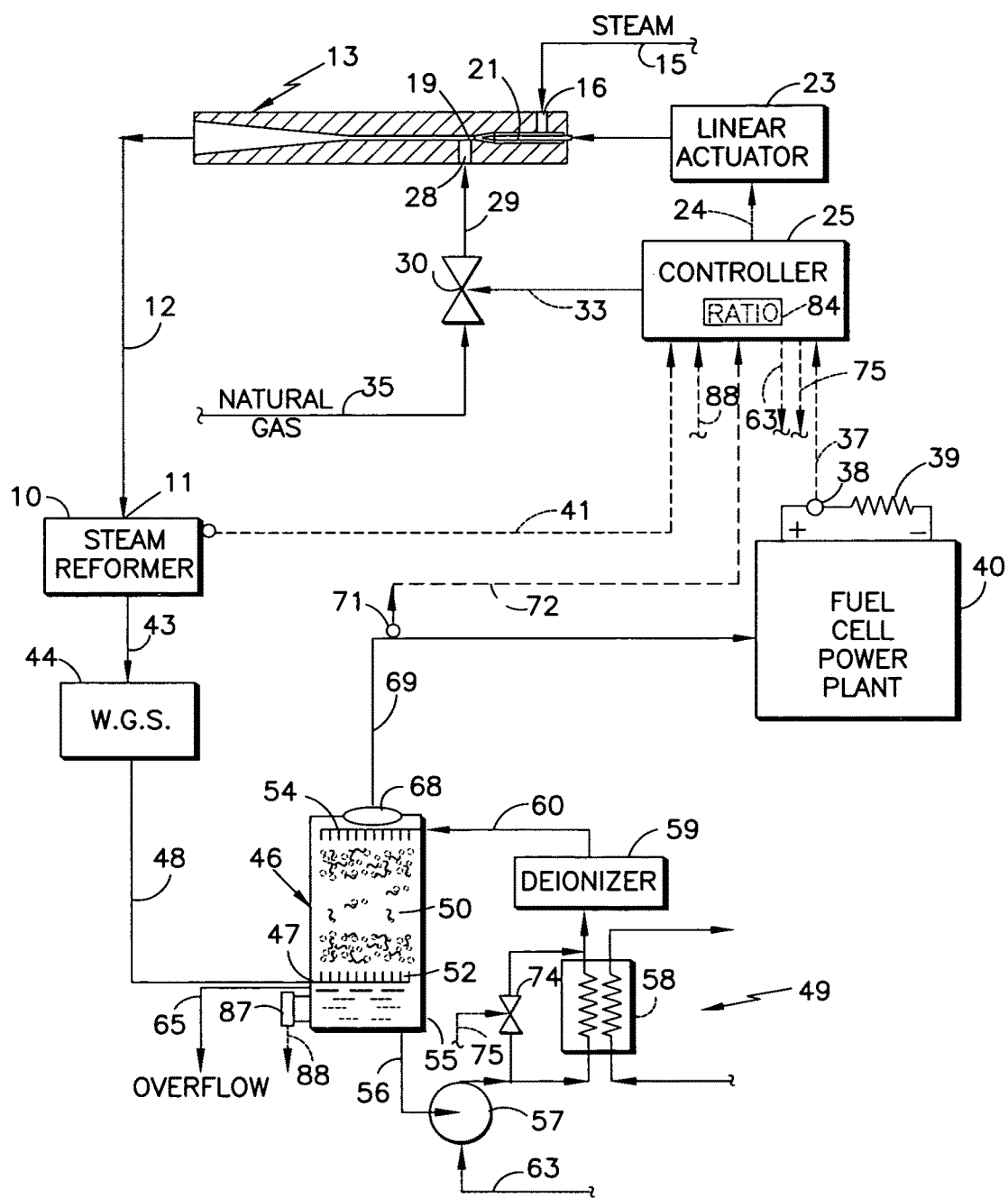
FIG. 1 is a schematic illustration of the steam/carbon ratio measurement and control system, which is carried out by utilizing the separation scrubber of an ammonia removal system, without any additional hardware.

An exemplary embodiment is shown in FIG. 1. A steam reformer 10 receives at an inlet 11 a mixture of steam and natural gas through a conduit 12 from an ejector 13. Steam in a conduit 15 is provided to the primary inlet 16 of the ejector 13. The effective area of the ejector metering orifice 19 is adjusted by the position of a needle 21, sometimes referred to as a pintle or a plug. The needle 21 is positioned by a linear actuator 23 in response to a signal in a line 24 from a controller 25. Natural gas in a conduit 29 is provided to the secondary inlet 28 of the ejector 13. The flow into the inlet 28 from a conduit 29 is controlled by a metering valve 30 in response to a signal on a line 33 from the controller 25.

The controller determines the signal in the line 24 partially in response to a signal in a line 37 from a current sensor 38 indicative of current flow through the load 39 of a fuel cell 40. The controller 25 provides the signal on line 24 also in response to a signal on a line 41 from a temperature sensor 42 which indicates the temperature of the reformer. Thus, the controller 25 controls the area of the ejector metering orifice 19 in response to the fuel cell power plant load current and the temperature of the steam reformer, and also in response to the dew point of the reformate, which is indicative of steam/carbon ratio, according to the disclosure hereinafter.

The reformate gas generated by the steam reformer 10 passes through a conduit 43 to a water gas shift reactor 44, in which water and CO react to form more hydrogen as well as CO2.

The reformate is cooled in an apparatus, such as a separator scrubber 46, which receives reformate at an inlet 47 from a conduit 48. The separator scrubber 46 is part of an ammonia removal subsystem 49. The separator scrubber 46 includes an ammonia dissolving bed 50 which comprises a packed bed of high surface area medium such as open cell foam, unitary integral ceramic foam, honey-comb materials, corrugated materials, metal or ceramic packing, or wire mesh structures. In an alternative design, the bed may be a fluidized bed using a fluidizable material.

The reformate is passed through a manifold 52 so that the reformate passes upwardly through the packed bed 50 as water flows downwardly through the packed bed 50 from a water distribution mechanism 54, such as orifices, disposed above the packed bed. The water that flows downwardly through the packed bed is collected in an accumulator 55 and passed through a conduit 56 to a pump 57. The pump 57 forces the water upwardly, through a heat exchanger 58 and a deionizer 59, and then through a conduit 60 to the water distribution mechanism 54. The pump 57 may be regulated by a signal on a line 63 from the controller 25. The accumulator 55 may have an overflow line 65, and a makeup water feed, not shown.

The deionizer 59 (sometimes referred to as a demineralizer) includes an ion exchange bed, such as a cation exchange resin, and preferably a hydrogen form cation exchange resin to remove ammonia, which is harmful in phosphoric acid fuel cells and proton exchange membrane fuel cells. The outlet 68 of scrubber 46 may include a mist eliminator which prevents water droplets from moving along with the reformate stream in a conduit 69.

The temperature of the reformate in the conduit 69 is determined by a temperature sensor 71, which passes a signal over a line 72 to the controller 25. The temperature indication on the line 72 may be utilized by the controller to control the temperature of the water in the conduit 60 being fed to the water distribution mechanism 54 in the scrubber 46, by means of controlling the pump 57 by signals on the line 63 or by controlling a heat exchanger bypass valve 74 by means of a signal on a line 75. Control of the water temperature flowing downwardly through the scrubber 46 will adjust, inversely, the amount of ammonia dissolved into the water. A separator scrubber system of this type is disclosed in Patent Publication WO 2008/036090 A1, incorporated herein by reference.

Because the water distribution mechanism 54 supplies excessive water, the reformate gas passing through the mist eliminator 68 is saturated with water. If the temperature of the water supplied to the bed 50 cools the superheated reformate entering the inlet 47 to its dew point, there will be no water evaporated into or condensed from the reformate passing from the manifold 52 upwardly through the bed 50. In such a case, the temperature of the reformate in the conduit 69 will be the dew point of the reformate.

A level sensor 87 provides a signal on a line 88 to the controller 25. If the controller senses an increasing water level, the temperature at sensor 71 will be lower than the true dew point, so the calculated steam/carbon ratio needs to be adjusted higher; if the signal on the line 88 indicates a decreasing water level, the calculated steam/carbon ratio needs to be adjusted lower. In addition, whenever there is an increase or a decrease in the water level, the temperature of the water in the conduit 60 must be increased or reduced by adjusting the valve 74 by means of the signal on the line 75. The temperature of the gas represents its dew point, so long as the water level in the accumulator 55 remains constant.

From the dew point indicated by the signal on the line 72, the controller can calculate a close approximation of the steam/carbon ratio of the reformate in the conduit 69. This can be presented in a display, such as the display 84 associated with the controller 25. From this, service personnel can track the drifting of the steam/carbon ratio over time, or detect if the steam/carbon ratio goes out of preferred limits.

Figure 2:
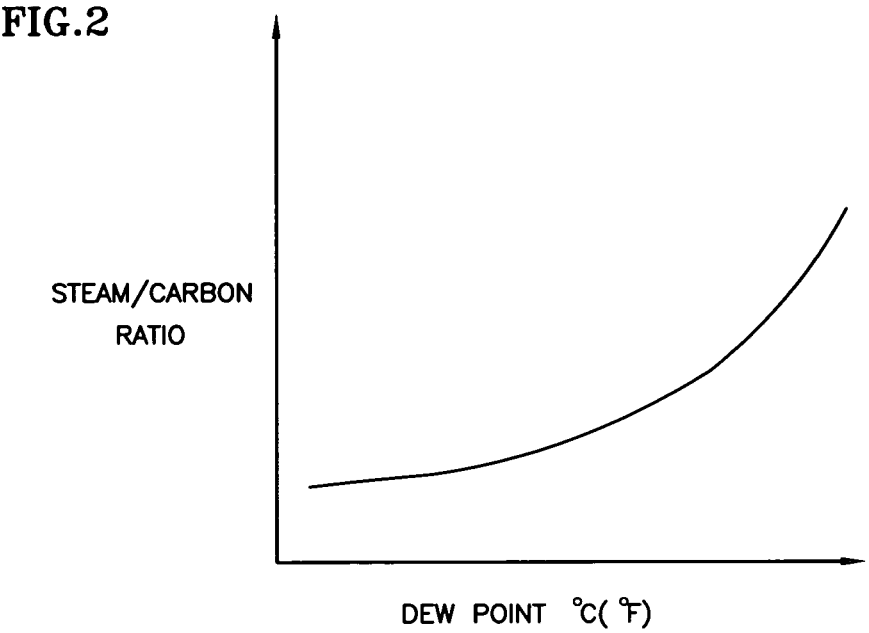
FIG. 2 is a graph illustrating reformate steam/carbon ratio as a function of reformate dew point.

In addition, the controller 25 can utilize the dew point indicated by the signal on the line 72 to bias or adjust the steam/carbon ratio. The relationship between stem/carbon ratio and dewpoint is illustrated in FIG. 2. This may be done, for instance, as simply as adding or subtracting a value to the signal to be provided on the line 24 which adjusts the setting of the ejector 13 to control the amount of steam flow through the primary inlet 16. The fuel flow through the secondary inlet 28 can be adjusted by the signal on line 33 to the fuel valve 30. This will accommodate the change in fuel flow that results, in the ejector, from each change in steam flow. During steady state operation, this approach acts as a tuning device to auto tune the steam/carbon ratio for the reformer. This is important because an increase in electrical efficiency is possible. The conventional operating process controls the steam/carbon ratio at about 3.25. This level is higher than optimum for reformer performance but necessary to protect the reformer from potential carbon build up that may occur if the steam/carbon ratio drops below about 2.50. The net result can reach an efficiency improvement of 0.5%.

With either embodiment of the steam/carbon ratio measurement and control system, it is possible to adjust the steam ejector 13 so as to run the steam/carbon ratio a small fraction above 2.50 in steady state, which increases the efficiency. During transients, (such as changes in the load current), the steam/carbon ration may be raised by some amount to ensure that it won't drop below about 2.50. Thus, in a system having an ammonia scrubber, the steam/carbon ratio can be measured and displayed and can be controlled to a very close approximation, utilizing only apparatus which is already in place. However, in any system in which an ammonia scrubber is not in place, the invention may be utilized simply by cooling the reformate to its dew point, and utilizing the temperature of the dew point to closely approximate the steam/carbon ratio, display it, and use it to control the amount of steam and fuel being presented to the ejector.

Figure 3:
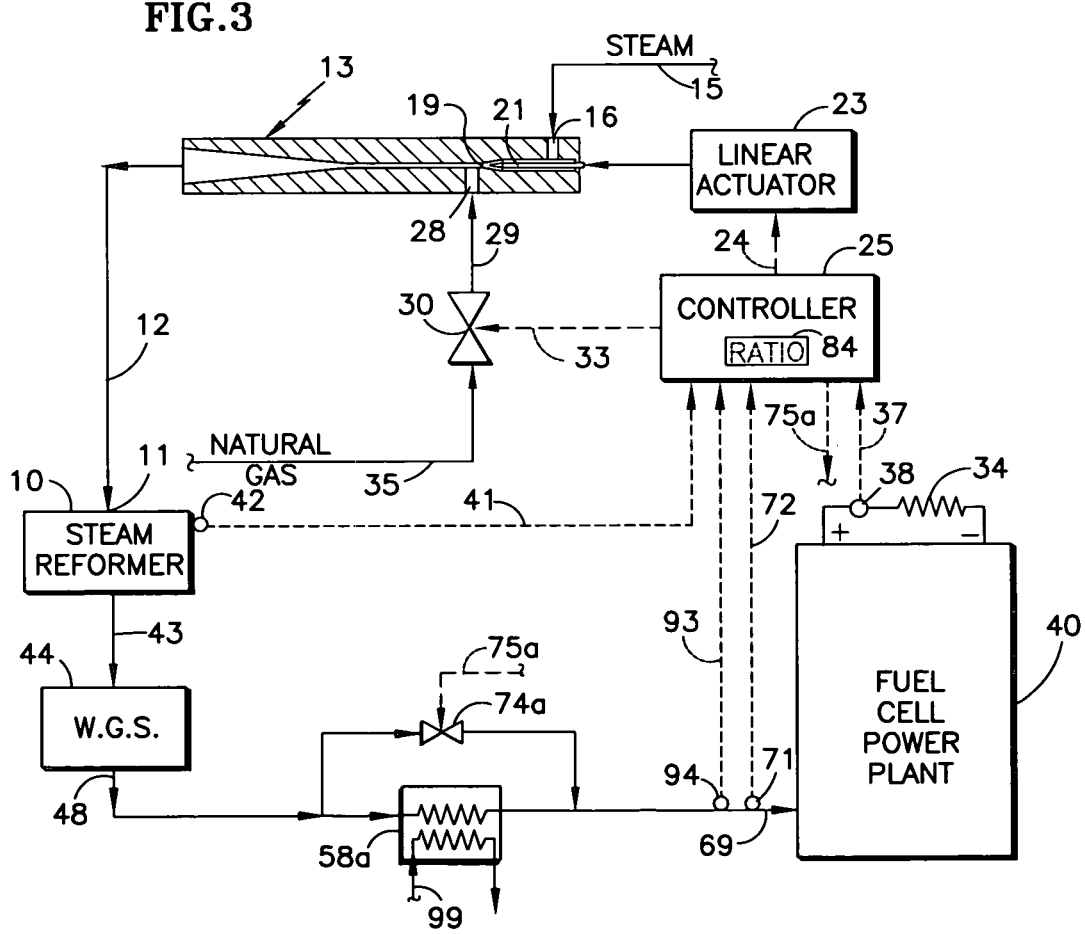
FIG. 3 is a schematic illustration of the steam/carbon ratio measurement and control system, utilizing only a controlled heat exchanger to cool the reformate to its dew point.

In FIG. 1, the reformate is cooled by the water flowing downwardly through the scrubber 46, and that water is cooled in the heat exchanger 58, the amount of cooling being controlled by the bypass valve 74 in response to a signal on a line 75 from the controller 25. Similarly, in FIG. 3, a heat exchanger 58a cools the reformate in an amount determined by the bypass valve 74a in response to the signal on the line 75a. The cool side 99 of the heat exchanger will comprise a flow of water. The controller 25 responds not only to the temperature of the reformate, indicated by a signal on the line 72 from the temperature sensor 71, but also to the pressure of the reformate indicated by a signal on a line 93 from a pressure sensor 94. When the pressure and temperature of the reformate in the conduit 69 indicate that the reformate is at its dew point, the controller 25 can modify the steam signal on the line 24 to the linear actuator 23, thereby to bring the steam/carbon ratio to a predetermined amount.

If the system is running at atmospheric pressure, the pressure at the temperature sensor 71 will vary only by a few inches of water, which is insignificant in this system; thus, the pressure sensor 94 would be unnecessary in such a case. The pressure of the reformate in the conduit 69 could also be determined from system operational parameters.

The preceding description is illustrative rather than limiting in nature. Variations and modifications to the disclosed embodiments may become apparent to those skilled in the art that do not necessarily depart from the essence of the invention. The scope of legal protection given to this invention can only be determined by studying the following claims.

We claim:

1. An apparatus, comprising:
    a reformer configured to generate reformate from hydrocarbon fuel and steam;
    a scrubber downstream of the reformer, the scrubber being configured to at least partially remove ammonia from the reformate;
    a temperature sensor configured to measure a temperature of the reformate exiting the scrubber;
    a water level sensor configured to measure the water level in at least a selected portion of the scrubber; and
    a controller programmed to determine a first water level at a first measurement time, determine a second water level at a second measurement time subsequent to the first measurement time, and determine that the temperature of the reformate is the dew point temperature when the first water level equals the second water level, wherein the controller is programmed to adjust a steam/carbon ratio of hydrocarbon fuel and steam supplied to the reformer when the temperature of the reformate is not the dew point temperature.

2. The apparatus of claim 1, wherein the controller is programmed to
    determine that the temperature of the reformate is below the dew point temperature when the second water level is greater than the first water level; and
    determine that the temperature of the reformate is above the dew point temperature when the second water level is less than the first water level.

3. The apparatus of claim 1, wherein the controller is programmed to increase the steam/carbon ratio when the temperature of the reformate is below the dew point temperature.

4. The apparatus of claim 1, wherein the controller is programmed to decrease the steam/carbon ratio when the temperature of the reformate is above the dew point temperature.

5. The apparatus of claim 1, comprising an ejector upstream of the reformer, wherein
    the ejector has a first inlet configured to receive the steam,
    the ejector has a second inlet configured to receive the hydrocarbon fuel, and
    the controller is programmed to control a steam/carbon ratio of fluid provided by the ejector to the reformer by selectively adjusting a flow capacity through the first inlet and second inlet, respectively.

6. The apparatus of claim 1, wherein the controller is programmed to selectively adjust the steam/carbon ratio of the steam and hydrocarbon fuel supplied to the reformer so the temperature of the reformate is the dew point temperature.

7. The apparatus of claim 6, wherein the controller is programmed to maintain the steam/carbon ratio above 2.5 and up to 3.25.

8. The apparatus of claim 1, comprising at least one fuel cell that is configured to receive the reformate and generate electricity based on an electrochemical reaction within the at least one fuel cell.

9. A method, comprising:
    generating reformate in a reformer from hydrocarbon fuel and steam;
    at least partially removing ammonia from the reformate within a scrubber;
    determining a temperature of the reformate exiting the scrubber;
    determining a first water level in at least a selected portion of the scrubber at a first measurement time;
    determining a second water level in at least the selected portion of the scrubber at a second measurement time subsequent to the first measurement time;
    determining that the temperature of the reformate fluid is the dew point temperature when the first water level equals the second water level; and
    adjusting a steam/carbon ratio of hydrocarbon fuel and steam supplied to the reformer when the temperature of the reformate fluid is not the dew point temperature.

10. The method of claim 9, comprising
    determining that the temperature of the reformate is below the dew point temperature when the second water level is greater than the first water level; and
    determining that the temperature of the reformate is above the dew point temperature when the second water level is less than the first water level.

11. The method of claim 9, comprising:
    increasing the steam/carbon ratio when the temperature of the reformate is below the dew point temperature, or
    decreasing the steam/carbon ratio when the temperature of the reformate is above the dew point temperature.

12. The method of claim 9, wherein
    an ejector is upstream of the reformer,
    the ejector has a first inlet that receives the steam,
    the ejector has a second inlet that receives the hydrocarbon fuel, and
    controlling the steam/carbon ratio of steam and hydrocarbon fuel provided by the ejector to the reformer by selectively adjusting a flow capacity through the first inlet and second inlet, respectively.

13. The method of claim 9, comprising selectively adjusting the steam/carbon ratio of the steam and hydrocarbon fuel supplied to the reformer so the temperature of the reformate is the dew point temperature.

14. The method of claim 13, comprising maintaining the steam/carbon ratio above 2.5 and up to 3.25.

15. The method of claim 9, comprising providing the reformate to at least one fuel cell and generating electricity based on an electrochemical reaction within the at least one fuel cell.

* * * * *